United States Patent
Manz et al.

(10) Patent No.: US 11,752,735 B2
(45) Date of Patent: Sep. 12, 2023

(54) FUNCTIONAL ELEMENT HAVING ELECTRICALLY CONTROLLABLE OPTICAL PROPERTIES

(71) Applicant: SAINT-GOBAIN GLASS FRANCE, Courbevoie (FR)

(72) Inventors: Florian Manz, Aachen (DE); Jefferson Do Rosario, Aachen (DE); Marcel Klein, Baesweiler (DE); Michael Labrot, Aachen (DE); Andreas Sznerski, Alsdorf (DE); Sebastian Schurse, Übach-Palenberg (DE); Valentin Schulz, Niederzier (DE)

(73) Assignee: SAINT-GOBAIN GLASS FRANCE, Courbevoie (FR)

( * ) Notice: Subject to any disclaimer, the term of this patent is extended or adjusted under 35 U.S.C. 154(b) by 0 days.

(21) Appl. No.: 17/251,053

(22) PCT Filed: Jun. 6, 2019

(86) PCT No.: PCT/EP2019/064765
§ 371 (c)(1),
(2) Date: Dec. 10, 2020

(87) PCT Pub. No.: WO2019/238520
PCT Pub. Date: Dec. 19, 2019

(65) Prior Publication Data
US 2021/0197532 A1   Jul. 1, 2021

(30) Foreign Application Priority Data
Jun. 11, 2018 (EP) ..................... 18177031

(51) Int. Cl.
*B32B 17/10* (2006.01)
*B32B 3/04* (2006.01)
(Continued)

(52) U.S. Cl.
CPC .......... *B32B 17/10504* (2013.01); *B32B 3/04* (2013.01); *B32B 17/10036* (2013.01);
(Continued)

(58) Field of Classification Search
CPC ................ B32B 3/04; B32B 17/10036; B32B 17/10504; B32B 17/10761; B32B 37/182;
(Continued)

(56) References Cited

U.S. PATENT DOCUMENTS 5,612,804 A    3/1997 Hara
6,563,625 B1*  5/2003 Athenstaedt .......... G02F 1/1525
                                                  359/265

(Continued)

FOREIGN PATENT DOCUMENTS

CN    102859422 A    1/2013
CN    107614302 A    1/2018
(Continued)

OTHER PUBLICATIONS

International Search Report as issued in International Patent Application No. PCT/EP019/064765, dated Sep. 9, 2019.
(Continued)

*Primary Examiner* — Travis M Figg
*Assistant Examiner* — Ethan Weydemeyer
(74) *Attorney, Agent, or Firm* — Pillsbury Winthrop Shaw Pittman LLP

(57) ABSTRACT

An improved functional element having electrically controllable optical properties includes a stack sequence formed of a first carrier film, a first surface electrode, an active layer, a second surface electrode, and a second carrier film, wherein the second carrier film is folded around the edge of the first carrier film at least at one side edge and seals an exit surface of the active layer at the side edge.

20 Claims, 4 Drawing Sheets

Figure 1:
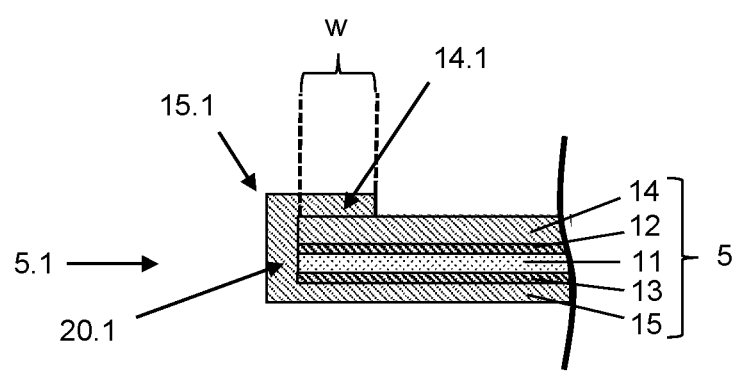

(51) Int. Cl.
   *B32B 38/00*      (2006.01)
   *B32B 37/18*      (2006.01)
   *B32B 38/10*      (2006.01)
(52) U.S. Cl.
   CPC ...... *B32B 17/10761* (2013.01); *B32B 37/182* (2013.01); *B32B 38/10* (2013.01); *B32B 2305/55* (2013.01); *B32B 2307/71* (2013.01); *B32B 2605/08* (2013.01)
(58) Field of Classification Search
   CPC . B32B 38/10; B32B 2305/55; B32B 2307/71; B32B 2605/08
   See application file for complete search history.

(56) References Cited

U.S. PATENT DOCUMENTS

| | | | |
|---|---|---|---|
| 7,387,856 B2 * | 6/2008 | Chari | C09K 19/544 430/20 |
| 2006/0228564 A1 | 10/2006 | Demiryont | |
| 2013/0141656 A1 | 6/2013 | Kujawa et al. | |
| 2015/0301367 A1 * | 10/2015 | Mennig | B32B 17/10761 156/60 |
| 2016/0138328 A1 | 5/2016 | Behmke et al. | |

FOREIGN PATENT DOCUMENTS

| | | |
|---|---|---|
| DE | 10 2005 007427 A1 | 8/2006 |
| DE | 10 2005 049081 B3 | 6/2007 |
| DE | 10 2007 027296 A1 | 12/2008 |
| DE | 10 2013 001334 A1 | 7/2014 |
| DE | 20 2018 102520 A1 | 5/2018 |
| JP | H06-148668 A | 5/1994 |
| JP | H10-278142 A | 10/1998 |
| JP | 2004-131335 A | 4/2004 |
| JP | 2007-326763 A | 12/2007 |
| JP | 2008-144458 A | 6/2008 |
| JP | 2009-534557 A | 9/2009 |
| JP | 2013-040089 A | 2/2013 |
| JP | 2016-504217 A | 2/2016 |
| JP | 2018-537379 A | 12/2018 |
| KR | 10-2015-0092247 A | 8/2015 |
| KR | 10-2018-0059531 A | 6/2018 |
| WO | WO 2007/122429 A1 | 11/2007 |
| WO | WO 2010/032068 A1 | 3/2010 |
| WO | WO 2014/086555 A1 | 6/2014 |
| WO | WO 2017/135182 | 8/2017 |
| WO | WO 2017/157626 A1 | 9/2017 |

OTHER PUBLICATIONS

Notice of Reasons for Rejections as issued in Japanese Patent Application No. 2020-568779, dated Feb. 8, 2022.
Notice of Preliminary Rejection as issued in Korean Patent Application No. 10-2021-7000130, dated May 30, 2022.
First Office Action as issued in Chinese Patent Application No. 201980001501.2, dated Jul. 27, 2022.

* cited by examiner

FUNCTIONAL ELEMENT HAVING ELECTRICALLY CONTROLLABLE OPTICAL PROPERTIES

CROSS-REFERENCE TO RELATED APPLICATIONS

This application is the U.S. National Stage of PCT/EP2019/064765, filed Jun. 6, 2019, which in turn claims priority to European patent application number filed 18177031.4 filed Jun. 11, 2018. The content of these applications are incorporated herein by reference in their entireties.

The invention relates to a functional element having electrically controllable optical properties and in particular a windshield with an electrically controllable sun visor, a method for producing such a functional element, as well as a composite pane having a functional element.

In the vehicle sector and in the construction sector, composite panes with electrically controllable functional elements are often used as sun screens or as privacy screens.

Thus, for example, windshields are known in which a sun visor is integrated in the form of a functional element having electrically controllable optical properties. In particular, the transmittance or scattering properties of electromagnetic radiation in the visible range are electrically controllable. The functional elements are usually filmlike and are laminated into or glued onto a composite pane. In the case of windshields, the driver can control the transmittance behavior of the pane itself relative to sunlight. Thus, a conventional mechanical sun visor can be dispensed with. As a result, the weight of the vehicle can be reduced and space gained in the roof region. In addition, the electrical control of the sun visor is more convenient than the manual folding down of the mechanical sun visor.

Windshields with such electrically controllable sun visors are, for example, known from WO 2014/086555 A1, WO 2017/157626 A1, DE 102013001334 A1, DE 102005049081 B3, DE 102005007427 A1, and DE 102007027296 A1.

Typical electrically controllable functional elements contain electrochromic layer structures or suspended particle device (SPD) films. Further possible functional elements for realizing an electrically controllable sun screen are so-called PDLC functional elements (polymer dispersed liquid crystal). Their active layer contains liquid crystals that are embedded in a polymer matrix. When no voltage is applied, the liquid crystals are randomly oriented, resulting in strong scattering of the light passing through the active layer. When a voltage is applied on the surface electrodes, the liquid crystals align themselves in a common direction and the transmittance of light through the active layer is increased. The PDLC functional element acts less by reducing total transmittance, but, instead, by increasing scattering to ensure protection against dazzling. Such functional elements are, for example, known from DE 202018102520 U1.

Prior art, laminated functional elements and, in particular, PDLC functional elements often present, in the edge region, undesirable aging phenomena, such as brightening and changes in shading, as is known, for example, from WO 2007/122429 A1.

The object of the present invention is, consequently, to provide an improved functional element having electrically controllable optical properties that is improved, in particular, with regard to its aging resistance.

The object of the present invention is accomplished by a functional element in accordance with the independent claim 1. Preferred embodiments emerge from the dependent claims.

Further aspects of the invention include improved composite panes having functional elements according to the invention as well as methods for producing the functional element, methods for producing a composite pane, and use thereof.

A functional element having electrically controllable optical properties comprises at least a stack sequence formed of
a first carrier film,
a first surface electrode,
an active layer,
a second surface electrode, and
and a second carrier film,
wherein the second carrier film is folded around the first carrier film at least at one side edge.

In an advantageous embodiment of the functional element according to the invention, the second carrier film seals an exit surface of the active layer at the respective side edge.

The first surface electrode is arranged on the inward surface of the first carrier film and preferably bonded directly thereto. The second surface electrode is arranged on the inward surface of the second carrier film and preferably bonded directly thereto.

As a result of folding the second carrier film around the side edge of the first carrier film, the inward surface of the second carrier film is arranged, in the folded region, in the immediate proximity of the outward surface of the first carrier film.

In an advantageous development of the functional element according to the invention, the second carrier film has an overhang beyond the first carrier film, i.e., the second carrier film has an overhanging region with the width u. In other words: the second carrier film is dimensioned wider in this region.

The terms "overhang" or "to overhang" mean, as generally commonly used: to protrude beyond something in a lateral (horizontal) direction. In this case, the second carrier film protrudes in the plane of the functional element beyond the first carrier film. Here, "lateral" means as generally commonly used: to the side or sideways. To simplify the description, the entire region around which the second carrier film is longer that the first carrier film is referred to as the "overhanging region", even when the overhanging region is routed out of the lateral plane and folded around the side edge of the first carrier film. The folding can be carried out manually or automated by machine, for example, by a robot.

The overhanging region advantageously has a width u of at least 4 mm, preferably of at least 6 mm, and particularly preferably of at least 8 mm.

The overhanging region preferably has a maximum width u of 50 mm, preferably of 20 mm, and particularly preferably of 10 mm. Particularly advantageous is an overhanging region with a width u of 0.5 mm to 50 mm.

Alternatively, the overhanging region u of the second carrier film can be wider than the entire first carrier film such that the folded-around region of the second carrier film completely covers the outward surface of the first carrier film and preferably protrudes beyond the side edge opposite the folding or, particularly preferably, is folded around it again.

In an advantageous development of the functional element according to the invention, the overhanging and folded-around region is materially and/or form-fittingly bonded to an edge region of the first carrier film, preferably fused and/or glued.

In an advantageous development of the functional element according to the invention, the width w of the region folded around and bonded to the edge region of the first carrier film is roughly equal to the width of the overhang u minus the sum of the thickness of the first carrier film, the thickness of the first surface electrode, the thickness of the active layer, and the thickness of the second surface electrode. As a result, the second carrier film rests, in the overhanging region, close to the exit surface of the active layer and the side edge of the first carrier film and, thus, seals the exit surface particularly well and, ideally, hermetically.

Of course, the functional element can have a folded-around seal according to the invention at at least one side edge, preferably at two, three, four, or all side edges. It is irrelevant for the seal whether only the second carrier film has an overhanging region at one or a plurality of the side edges or whether alternatively even at least one first carrier film has an overhanging region that is folded around the second carrier film.

A composite pane according to the invention comprises at least:
- a stack sequence formed of an outer pane, a first intermediate layer, a second intermediate layer, and an inner pane, wherein the intermediate layers include, in each case, at least one thermoplastic polymer film with at least one plasticizer, and
- a functional element according to the invention having electrically controllable optical properties is arranged between the first intermediate layer and the second intermediate layer at least in sections.

The composite pane can, for example, be the windshield or the roof panel of a vehicle or another vehicle glazing, for example, a separating pane in a vehicle, preferably in a rail vehicle or a bus. Alternatively, the composite pane can be an architectural glazing, for example, in an external facade of a building or a separating pane in the interior of a building.

The terms "outer pane" and "inner pane" arbitrarily describe two different panes. In particular, the outer pane can be referred to as "a first pane" and the inner pane as "a second pane".

When the composite pane is provided, in a window opening of a vehicle or of a building, to separate an interior from the external environment, "inner pane" refers, in the context of the invention, to the pane (second pane) facing the interior (vehicle interior). "Outer pane" refers to the pane (first pane) facing the external environment. The invention is, however, not restricted to this.

The functional element can also be arranged on both sides in the composite pane. In other words, either the first carrier film is arranged on the side of the functional element facing the outer pane or on the side of the functional element facing the inner pane.

The composite pane according to the invention includes a functional element having electrically controllable optical properties that is arranged, at least in sections, between a first intermediate layer and a second intermediate layer. The first and second intermediate layer customarily have the same dimensions as the outer pane and the inner pane. The functional element is preferably filmlike.

In an advantageous embodiment of a composite pane according to the invention, the inward, folded-around regions of the second carrier film and the outward edge of the first carrier film are bonded to one another, preferably pressed together (for example, by lamination in a composite pane), glued, or welded (for example, by local heating). As a result, a sufficient and secure diffusion barrier against plasticizers from the intermediate layer is produced and clouding of the edge region of the functional element is reduced or prevented.

In another advantageous embodiment of a composite pane according to the invention, the inward, folded-around regions of the second carrier film and outward edge of the first carrier film are joined to one another over their entire surface and preferably glued, for example, by an adhesive, in particular by an acrylic-based adhesive, preferably acrylate-based, and most particularly preferably an adhesive that contains more than 50% methyl methacrylate. This has the particular advantage that slippage during assembly and during lamination is avoided and the second carrier film film is firmly and fittingly joined to the first carrier film. As result, among other things, air inclusions are avoided and the optical quality of such functional elements and composite panes is particularly high.

The invention is based on the realization by the inventors that the diffusion of plasticizers out of the intermediate layers into the interior of the functional element during aging results in a brightening or a change in transmittance which impairs the through-vision and aesthetics of the composite pane. As a result of the sealing of the exit surface of the active layer of the functional element with the carrier film, which impedes or prevents the diffusion of plasticizers out of the intermediate layer into the exit surface of the active layer, such aging phenomena are significantly reduced or completely prevented.

In an advantageous embodiment of a composite pane according to the invention, the intermediate layer contains a polymer, preferably a thermoplastic polymer.

In a particularly advantageous embodiment of a composite pane according to the invention, the intermediate layer contains at least 3 wt.-%, preferably at least 5 wt.-%, particularly preferably at least 20 wt.-%, even more preferably at least 30 wt.-%, and in particular at least 40 wt.-% of a plasticizer. Preferably, the plasticizer contains or is made of triethylene glycol-bis(2-ethyl hexanoate).

Plasticizers are chemicals that make plastics softer, more flexible, smoother, and/or more elastic. They shift the thermoelastic range of plastics to lower temperatures such that the plastics have the desired more elastic properties in the range of the temperature of use. Other preferred plasticizers are carboxylic acid esters, in particular low-volatility carboxylic acid esters, fats, oils, soft resins, and camphor. Other plasticizers are preferably aliphatic diesters of tri- or tetra-ethylene glycol. Particularly preferably used as plasticizers are 3G7, 3G8, or 4G7, where the first digit indicates the number of ethylene glycol units and the last digit indicates the number of carbon atoms in the carboxylic acid portion of the compound. Thus, 3G8 represents triethylene glycol bis(2-ethyl hexanoate), in other words, a compound of the formula $C_4H_9CH(CH_2CH_3)CO(OCH_2CH_2)_3O_2CCH(CH_2CH_3)C_4H_9$.

In another particularly advantageous embodiment of a composite pane according to the invention, the intermediate layer contains at least 60 wt.-%, preferably at least 70 wt.-%, particularly preferably at least 90 wt.-%, and in particular at least 97 wt.-% polyvinyl butyral.

The thickness of each intermediate layer is preferably from 0.2 mm to 2 mm, particularly preferably from 0.3 mm to 1 mm, in particular from 0.3 mm to 0.5 mm, for example, 0.38 mm.

The controllable functional element according to the invention includes an active layer between two surface electrodes. The active layer has the controllable optical properties that can be controlled via the voltage applied to the surface electrodes. The surface electrodes and the active layer are typically arranged substantially parallel to the surfaces of the functional element and in a composite pane substantially parallel to the surfaces of the outer pane and the inner pane. The surface electrodes are electrically connected to an external voltage source in a manner known per se. The electrical contacting is realized by means of suitable connecting cables, for example, foil conductors that are optionally connected to the surface electrodes via so-called busbars, for example, strips of an electrically conductive material or electrically conductive imprints.

The surface electrodes are preferably designed as transparent, electrically conductive layers. The surface electrodes preferably contain at least a metal, a metal alloy, or a transparent conductive oxide (TCO). The surface electrodes can contain, for example, silver, gold, copper, nickel, chromium, tungsten, indium tin oxide (ITO), gallium-doped or aluminum-doped zinc oxide, and/or fluorine-doped or antimony-doped tin oxide. The surface electrodes preferably have a thickness of 10 nm to 2 µm, particularly preferably from 20 nm to 1 µm, most particularly preferably from 30 nm to 500 nm.

The functional element can have, besides the active layer and the surface electrodes, other layers known per se, for example, barrier layers, blocking layers, antireflection layers, IR reflection layers, protective layers, and/or smoothing layers.

The functional element is present as a multilayer film with two outer carrier films. In such a multilayer film, the surface electrodes and the active layer are arranged between the two carrier films. Here, "outer carrier film" means that the carrier films form the two surfaces of the multilayer film. The functional element can thus be provided as a laminated film that can be processed advantageously. The functional element is advantageously protected by the carrier films against damage, in particular corrosion. The multilayer film contains, in the order indicated, at least one first carrier film, one first surface electrode, one active layer, a second surface electrode, and a second carrier film. The carrier film carries, in particular, the surface electrodes and gives a liquid or soft active layer the necessary mechanical stability.

The carrier films preferably contain at least one thermoplastic polymer, particularly preferably low-plasticizer or plasticizer-free polyethylene terephthalate (PET). This is particularly advantageous in terms of the stability of the multilayer film. The carrier films can, however, also contain or be made of other low-plasticizer or plasticizer-free polymers, for example, ethylene vinyl acetate (EVA), polypropylene, polycarbonate, polymethyl methacrylate, polyacrylate, polyvinyl chloride, polyacetate resin, casting resins, acrylates, fluorinated ethylene propylenes, polyvinyl fluoride, and/or ethylene-tetrafluoroethylene. The thickness of each carrier film is preferably from 0.04 mm to 1 mm, particularly preferably from 0.05 mm to 0.2 mm.

The carrier films have in each case an electrically conductive coating that faces the active layer and acts as a surface electrode.

In another advantageous embodiment of a composite pane according to the invention, the functional element is a PDLC functional element (polymer dispersed liquid crystal). The active layer of a PDLC functional element contains liquid crystals that are embedded in a polymer matrix. When no voltage is applied on the surface electrodes, the liquid crystals are randomly oriented, resulting in strong scattering of the light passing through the active layer. The composite pane thus becomes an almost homogeneous light source. When a voltage is applied on the surface electrodes, the liquid crystals align in a common direction and the transmittance of light through the active layer is increased. Objects behind the pane become visible.

In principle, however, it is also possible to use other types of controllable functional elements, for example, electrochromic functional elements or SPD functional elements (suspended particle device). The controllable functional elements mentioned and their mode of operation are known per se to the person skilled in the art such that a detailed description can be dispensed with here.

Functional elements as multilayer films are commercially available. The functional element to be integrated is typically cut out of a multilayer film of relatively large dimensions in the desired shape and size. This can be done mechanically, for example, with a knife. In an advantageous embodiment, the cutting is done using a laser. It has been demonstrated that, in this case, the side edge is more stable than with mechanical cutting. With mechanically cut side edges, there can be a risk that a carrier film together with a surface electrode will become detached from the functional layer, which is visually conspicuous and adversely affects the aesthetics of the pane.

In the composite pane according to the invention, the functional element is joined to the outer pane via a region of the first intermediate layer and to the inner pane via a region of the second intermediate layer. The intermediate layers are preferably areally arranged one atop another and laminated to one another, with the functional element inserted between the two layers. The regions of the intermediate layers overlapping the functional element then form the region that joins the functional element to the panes. In other regions of the pane where the intermediate layers are in direct contact with one another, they can fuse during lamination such that the two original layers are possibly no longer discernible and there is, instead, one homogeneous intermediate layer. A
n intermediate layer can, for example, be formed by a single thermoplastic film. An intermediate layer can also be formed as a two-ply, three-ply, or multi-ply film stack, wherein the individual films have the same or different properties. An intermediate layer can also be formed from sections of different thermoplastic films having adjacent side edges.

In an advantageous development of a composite pane according to the invention, the region of the first or the second intermediate layer, via which the functional element is joined to the outer pane or to the inner pane, is tinted or colored. The transmittance of this region in the visible spectral range is thus reduced compared to a non-tinted or non-colored layer. The tinted/colored region of the intermediate layer thus reduces the transmittance of the windshield in the region of the sun visor. In particular, the aesthetic impression of the functional element is improved because the tinting results in a more neutral appearance, which has a more pleasant effect on the viewer.

For functional enhancement, an intermediate layer for acoustically optimized panes can also consist of three individual plies. In such cases, the intermediate layer is 0.05 mm to 0.2 mm thicker.

Another alternative is a thermal improvement by means of an IR reflecting coated PET intermediate ply. In this case, the outward-facing intermediate layer also consists of at least three intermediate plies (PVB-PET-PVB). The IR reflecting coating can be directed inward or outward.

In the context of the invention, "electrically controllable optical properties" means properties that are infinitely controllable but also those that can be switched between two or more discrete states.

The electrical control of the sun visor is done, for example, using switches, rotary knobs, or sliders that are integrated into the dashboard of the vehicle. However, a switch area for controlling the sun visor can also be integrated into the composite pane to be switched, for example, a windshield, for example, a capacitive switch area. Alternatively, or additionally, the sun visor can be controlled by contactless methods, for example, by gesture recognition, or as a function of the pupil or eyelid state detected by a camera and suitable evaluation electronics. Alternatively, or additionally, the sun visor can be controlled by sensors that detect light incidence on the pane.

In the transparent state, the tinted or colored region of the intermediate layer preferably has transmittance in the visible spectral range from 1% to 50%, particularly preferably from 10% to 40%. With that, particularly good results are achieved in terms of glare protection and visual appearance.

The intermediate layer can be formed by a single thermoplastic film, wherein the tinted or colored region is produced by local tinting or coloring. Such films can be obtained, for example, by coextrusion. Alternatively, a non-tinted film section and a tinted or colored film section can be combined to form the thermoplastic layer.

The tinted or colored region can be homogeneously colored or tinted, in other words, can have location-independent transmittance. The tinting or coloring can, however, be inhomogeneous, in particular a transmittance progression can be realized. In one embodiment, the transmittance level increases in the tinted or colored region, at least in sections, with increasing distance from the upper edge. Thus, sharp edges of the tinted or colored area can be avoided such that the transition from the sun visor into the transparent region of the windshield is gradual, appearing aesthetically more attractive.

In an advantageous embodiment, the region of the first intermediate layer, i.e., the region between the functional element and the outer pane is tinted. This gives a particularly aesthetic impression when the outer pane is viewed from above. The region of the second intermediate layer between the functional element and the inner pane can, optionally, be additionally colored or tinted.

In an advantageous embodiment, the inner and/or the outer pane can optionally be tinted. This results in an optically advantageous composite pane. In particular, for vehicle openings in which transparency is not limited, such as in the roof area, a visually attractive composite pane can be realized.

The composite pane having an electrically controllable functional element can advantageously be implemented as a windshield with an electrically controllable sun visor.

Such a windshield has an upper edge and a lower edge as well as two side edges extending between the upper edge and the lower edge. "Upper edge" refers to that edge that is intended to point upward in the installation position. "Lower edge" refers to that edge that is intended to point downward in the installation position. The upper edge is often referred to as the "roof edge"; the lower edge, as the "engine edge".

Windshields have a central field of vision, the optical quality of which is subject to high requirements. The central field of vision must have high light transmittance (typically greater than 70%). Said central field of vision is, in particular, that field of vision that is referred to by the person skilled in the art as field of vision B, vision area B, or zone B. The field of vision B and its technical requirements are specified in Regulation No. 43 of the Economic Commission for Europe of the United Nations (UN/ECE) (ECE-R43, "Uniform Provisions concerning the Approval of Safety Glazing Materials and Their Installation on Vehicles"). There, the field of vision B is defined in Annex 18.

The functional element is then advantageously arranged above the central field of vision (field of vision B). This means that the functional element is arranged in the region between the central field of vision and the upper edge of the windshield. The functional element does not have to cover the entire area, but is positioned completely within this area, and does not protrude into the central field of vision. In other words, the functional element is less distant from the upper edge of the windshield than the central field of vision. Thus, the transmittance of the central field of vision is not affected by the functional element which is positioned in a location similar to that of a conventional mechanical sun visor in the folded-down state.

The windshield is preferably provided for a motor vehicle, particularly preferably for a passenger car.

In a preferred embodiment, the functional element, more precisely the side edges of the functional element are circumferentially surrounded by a third intermediate layer. The third intermediate layer is designed like a frame with a recess into which the functional element is inserted. The third intermediate layer can also be formed by a thermoplastic film into which the recess is introduced by cutting. Alternatively, the third intermediate layer can also be composed of a plurality of film sections around the functional element. The intermediate layer is preferably formed from a total of at least three thermoplastic layers arranged areally atop one another, wherein the middle layer has a recess in which the functional element is arranged. During production, the third intermediate layer is arranged between the first and the second intermediate layer, with the side edges of all intermediate layers preferably arranged congruently. The third intermediate layer preferably has approx. the same thickness as the functional element. Thus, the local difference in thickness of the windshield introduced by the locally limited functional element is compensated such that glass breakage during lamination can be avoided.

The side edges of the functional element that are visible when looking through the windshield are preferably arranged flush with the third intermediate layer such that no gap exists between the side edge of the functional element and the associated side edge of intermediate layer. This is in particular true for the lower edge of the functional element, which is typically visible. Thus, the boundary between the third intermediate layer and the functional element is visually less noticeable.

In a preferred embodiment, the lower edges of the functional element and of the tinted region of the intermediate layer(s) are adapted to the shape of the upper edge of the windshield, yielding a more appealing visual impression. Since the upper edge of a windshield is typically curved, in particular concavely curved, the lower edge of the functional element and of the tinted region is also preferably curved. Particularly preferably, the lower edges of the functional element are substantially parallel to the upper edge of the windshield. It is, however, also possible to construct the sun visor from two halves, each straight, arranged at an angle relative to one another, and forming a virtually V-shaped upper edge.

In one embodiment of the invention, the functional element is divided into segments by isolation lines. The isolation lines can, in particular, be introduced into the surface electrodes such that the segments of the surface electrode are isolated from one another. The individual segments are connected to the voltage source independently of one another such that they can be actuated separately. Thus, different regions of the sun visor can be switched independently. Particularly preferably, the isolation lines and the segments are arranged horizontally in the installation position. Thus, the height of the sun visor can be controlled by the user. The term "horizontal" is to be interpreted broadly here and refers to a direction of extension that, in a windshield, runs between the side edges of the windshield. The isolation lines do not necessarily have to be straight, but can also be slightly curved, preferably adapted to possible curvature of the upper edge of the windshield, in particular substantially parallel to the upper edge of the windshield. Vertical isolation lines are, of course, also conceivable.

The isolation lines have, for example, a width of 5 μm to 500 μm, in particular 20 μm to 200 μm. The width of the segments, i.e., the distance between adjacent isolation lines can be suitably selected by the person skilled in the art according to the requirements of the individual case.

The isolation lines can be introduced by laser ablation, mechanical cutting, or etching during production of the functional element. Already laminated multilayer films can also be subsequently segmented by laser ablation.

The upper edge and the side edges or all side edges of the functional element are concealed in vision through the composite pane preferably by an opaque masking print or by an outer frame. Windshields typically have a circumferential peripheral masking print made of an opaque enamel, which serves in particular to visually conceal the adhesive used for installation of the window and to protect it against UV radiation. This peripheral masking print is preferably used to also conceal the upper edge and the side edge of the functional element as well as the necessary electrical connections. The sun visor is then advantageously integrated into the appearance of the windshield and only its lower edge is potentially discernible to the observer. Preferably, both the outer pane and also the inner pane have a masking print such that through-vision is prevented from both sides.

The functional element can also have recesses or holes, for instance, in the region of so-called sensor windows or camera windows. These regions are provided to be equipped with sensors or cameras whose function would be impaired by a controllable functional element in the beam path, for example, rain sensors. It is also possible to realize the sun visor with at least two functional elements separated from one another, with a distance between the functional elements providing space for a sensor window or a camera window.

The functional element (or the totality of the functional elements in the above-described case of a plurality of functional elements) is preferably arranged over the entire width of the composite pane or of the windshield, minus an edge region on both sides having a width of, for example, 2 mm to 50 mm. The functional element also preferably has a distance of, for example, 2 mm to 200 mm from the upper edge. The functional element is thus encapsulated within the intermediate layer and protected against contact with the surrounding atmosphere and corrosion.

The outer pane and the inner pane are preferably made of glass, particularly preferably of soda lime glass, as is customary for window panes. The panes can, however, also be made of other types of glass, for example, quartz glass, borosilicate glass, or aluminosilicate glass, or rigid clear plastics, for example, polycarbonate or polymethyl methacrylate. The panes can be clear, or also tinted or colored. Windshields must have adequate light transmittance in the central field of vision, preferably at least 70% in the primary through-vision zone A per ECE-R43.

The outer pane, the inner pane, and/or the intermediate layer can have further suitable coatings known per se, for example, antireflection coatings, nonstick coatings, antiscratch coatings, photocatalytic coatings, or solar protection coatings, or low-E coatings.

The thickness of the outer pane and the inner pane can vary widely and thus be adapted to the requirements of the individual case. The outer pane and the inner pane preferably have thicknesses of 0.5 mm to 5 mm, particularly preferably of 1 mm to 3 mm.

The invention also includes a method for producing a functional element having electrically controllable optical properties, wherein at least:

a) a stack sequence formed of a first carrier film, a first surface electrode, an active layer, a second surface electrode, and a second carrier film is provided, b) the first carrier film is cut back at at least one side edge, preferably at all side edges, by a region of the width u, by which means an overhanging region of the second carrier film is formed, and c) the overhanging region of the second carrier film is folded around the cut-back side edge of the first carrier film.

In an advantageous embodiment of the method according to the invention, electrical contacting, such as a busbar, is arranged on the overhanging region of the second carrier film. The electrical contacting can be connected here to the surface electrode on the second carrier film.

In an advantageous embodiment of the method according to the invention, between steps b) and c), the second surface electrode is removed in the overhanging region, preferably by mechanical, chemical, and/or physical removal, particularly preferably by laser ablation. Alternatively, the surface electrode can be treated by physical or chemical processes and thus made electrically insulating. All this serves to prevent short-circuits between the first and the second electrode. For complex shapes, additional separating cuts and/or additional material (plastic tape) are advantageously introduced.

In an advantageous embodiment of the method according to the invention, at least in one region of another side edge, the second carrier film is cut back, forming an overhanging region of the first carrier film, which is then folded around the second carrier film. In this region, additional electrical contacting, such as a busbar, can advantageously be arranged. The electrical contacting can be connected here to the surface electrodes on the first carrier film.

Another aspect of the invention also includes a method for producing a composite pane according to the invention, wherein at least a) one outer pane, one first intermediate layer, one functional element having electrically controllable optical properties, one second intermediate layer, and one inner pane are arranged one atop another in this order, b) the outer pane and the inner pane are joined by lamination, wherein an intermediate layer with an embedded functional element is formed from the first intermediate layer and the second intermediate layer.

The electrical contacting of the surface electrodes of the functional element is preferably done before the lamination of the composite pane.

Any prints that are present, for example, opaque masking prints or printed busbars for the electrical contacting contacting of the functional element are preferably applied by screen printing.

The lamination is preferably done under the action of heat, vacuum, and/or pressure. Methods known per se can be used for lamination, for example, autoclave methods, vacuum bag methods, vacuum ring methods, calender methods, vacuum laminators, or combinations thereof.

The invention further includes the use of a composite pane according to the invention having an electrically controllable functional element as interior glazing or exterior glazing in a vehicle or a building, wherein the electrically controllable functional element is used as a sun screen, as thermal protection, or as a privacy screen.

The invention further includes the use of a composite pane according to the invention as a windshield or roof panel of a vehicle, wherein the electrically controllable functional element is used as a sun visor. Here, too, segmentation can be advantageous such that with elimination of a roller blind or visor, the entry of sun can be individually adapted locally.

A major advantage of the invention, in the case of composite panes as a windshield, consists in that a conventional vehicle-roof-mounted, mechanically foldable sun visor can be dispensed with. Consequently, the invention also includes a vehicle, preferably a motor vehicle, in particular a passenger car, that has no such conventional sun visor.

The invention also includes the use of a tinted or colored region of an intermediate layer for joining a functional element having electrically controllable optical properties with an outer pane or an inner pane of the windshield, wherein an electrically controllable sun visor is realized by means of the tinted or colored region of the intermediate layer and the functional element. Of course, the tinted or colored region can also extend over the entire surface and can include the entire intermediate layer.

Figure 2A:
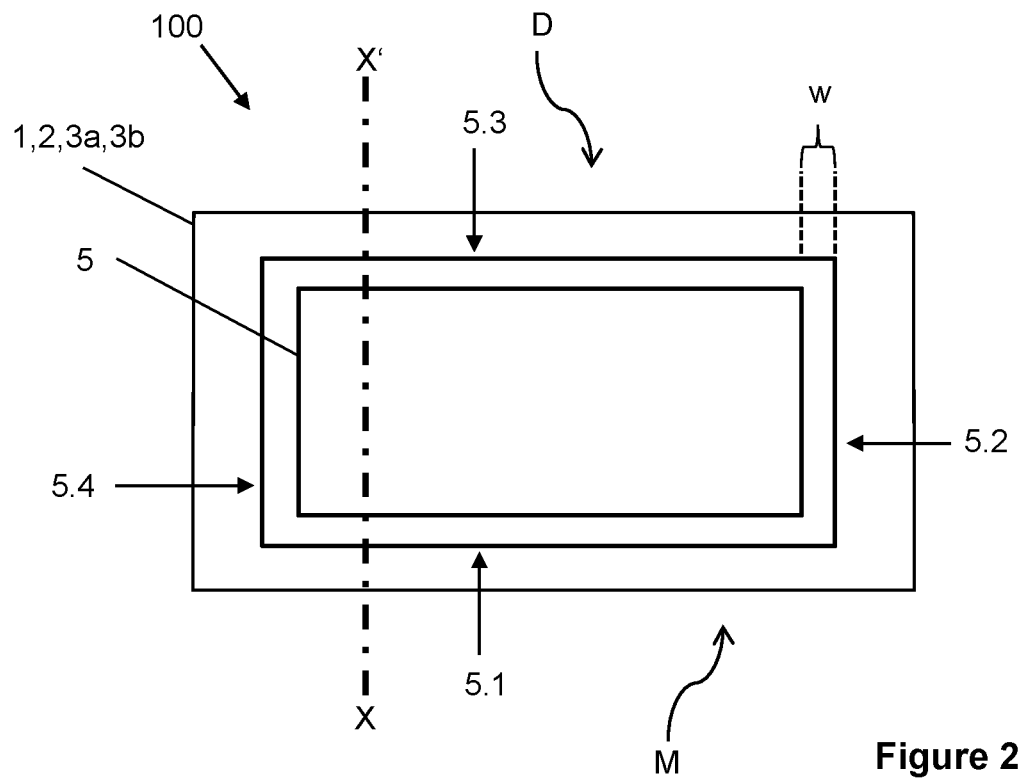
Figure 2B:
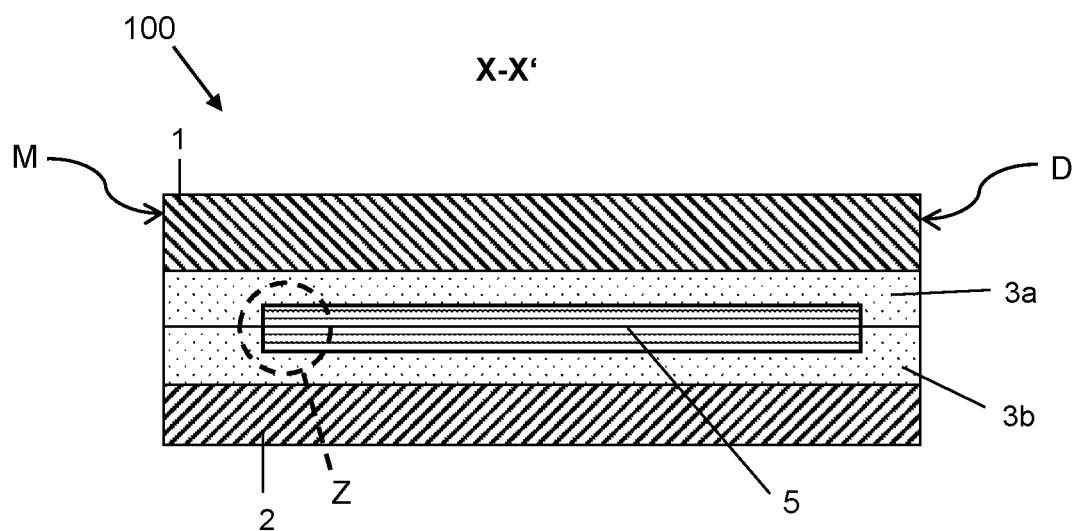
Figure 3A:
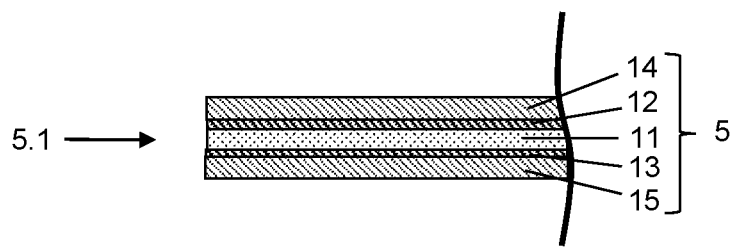
Figure 3B:
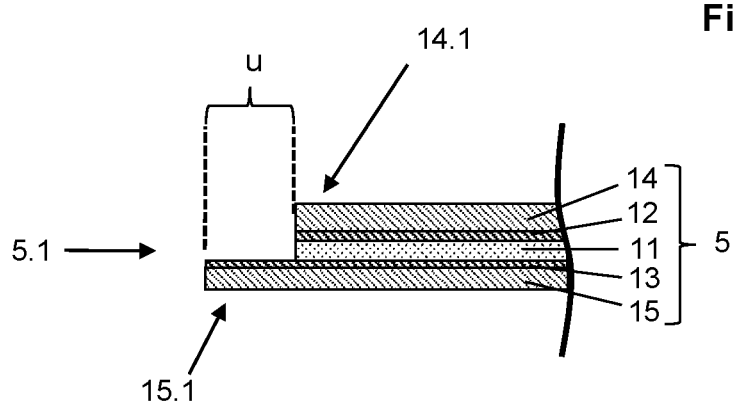
Figure 3C:
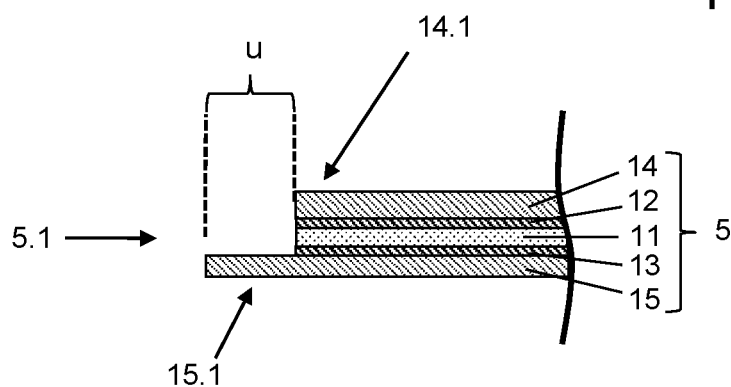
Figure 3D:
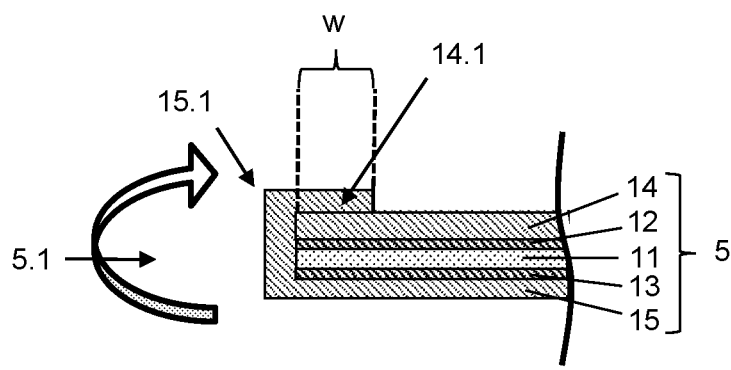
Figure 4:
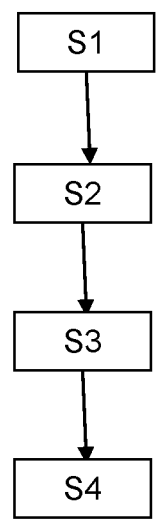

The invention is explained in detail with reference to drawings and exemplary embodiments. The drawings are schematic representations and not true to scale. The drawings in no way restrict the invention. They depict:

FIG. 1 an enlarged representation of a detail of a functional element according to the invention, FIG. 2A a plan view of a composite pane according to the invention, FIG. 2B a cross-section through the composite pane of FIG. 2A along the section line X-X', FIG. 3A, 3B, 3C, 3D representations of the individual steps for producing a functional element according to the invention, and FIG. 4 an exemplary embodiment of the method according to the invention with reference to a flowchart.

FIG. 1 depicts an enlarged representation of a detail of a functional element 5 according to the invention in the region of a side edge 5.1 of the functional element.

The controllable functional element 5 is, for example, a PDLC multilayer film comprising an active layer 11 that is arranged between a first surface electrode 12 and a second surface electrode 13. The first surface electrode 12 has, on the surface facing away from the active layer 11, a first carrier film 14 that stabilizes the surface electrode 12. The second surface electrode 13 has, on the surface facing away from the active layer 11, a second carrier film 15 that stabilizes the second surface electrode 13. Here, the active layer 11 contains a polymer matrix with liquid crystals dispersed therein, which align themselves as a function of the electrical voltage applied on the surface electrodes 12, 13, by which means the optical properties can be controlled. The carrier films 14, 15 are made of PET and have a thickness of, for example, 0.14 mm. The carrier films 14, 15 are provided with a coating of ITO having a thickness of approx. 100 nm facing the active layer 11, forming the surface electrodes 12, 13. The surface electrodes 12, 13 are, for example, applied in a known manner by means of a sputtering process. The surface electrodes 12, 13 can be connected to the vehicle's electrical system via busbars (not shown) (formed by a silver-containing screen print) and connection cables (not shown).

In the exemplary embodiment depicted, the second carrier film 15 is longer compared to the first carrier film 14; this is also referred to in the following as an overhang or overhanging region 15.1. The second carrier film 15 is folded around the first carrier film 14 in the overhanging region 15.1 at the side edge 5.1. As a result, the exit surface 20.1 of the active layer 11 is completely covered and sealed at the side edge 5.1. Here, the exit surface 20.1 identifies the surface of the active layer 11 that extends between the first and the second carrier films 14, 15 with the first and second surface electrode 12, 13 along the side edge 5.1 of the functional element 5 and at which the active layer 11 routed around has access to the surroundings of the functional element 5 without the overhanging region 15.1 of the second carrier film 15. The inward surface of the second carrier film 15 is thus arranged on the edge region 14.1 of the outward surface of the first carrier film 14. "Inward surface" of the carrier films and "outward surface" of the carrier films refer to the surfaces relative to the functional element 5.

The width w of the edge region 14.1, i.e., the contact surface of the inward surface of the second carrier film 15 and the outward surface of the first carrier film 14 is, for example, 10 mm here and substantially extends with a constant width over the entire length of the side edge 5.1.

FIG. 2A and FIG. 2B depict in each case a detail of a composite pane 100 according to the invention. The composite pane 100 comprises an outer pane 1 and an inner pane 2 that are joined to one another via a first intermediate layer 3a and a second intermediate layer 3b. The outer pane 1 has a thickness of 2.1 mm and is made, for example, of a clear soda lime glass. The inner pane 2 has a thickness of 1.6 mm and is also made, for example, of a clear soda lime glass. The composite pane 100 has a first edge referenced with D that is called the "upper edge" in the following. The composite pane 100 has a second edge referenced with M that is arranged opposite the upper edge D and is called the "lower edge" in the following. The composite pane 100 can be arranged, for example, as architectural glazing in the frame of a window with other panes to form an insulating glazing unit or as a roof panel in the roof of a vehicle. Of course, partition wall panels, side windows, or rear windows can also be designed advantageously according to the invention.

A functional element 5 according to the invention that is controllable in its optical properties via an electrical voltage is arranged between the first intermediate layer 3a and the second intermediate layer 3b. For the sake of simplicity, the electrical leads are not shown.

Here, the functional element according to the invention of FIG. 1 is, for example, the enlarged region Z, which is also reproduced in the following in FIG. 3D.

The intermediate layers 3a, 3b include in each case a thermoplastic film with a thickness of 0.38 mm. The intermediate layers 3a, 3b are made, for example, of 78 wt.-% polyvinyl butyral (PVB) and 20 wt.-% triethylene glycol bis(2-ethyl hexanoate) as plasticizer.

In this exemplary embodiment, three side edges 5.1, 5.2, 5.3 are sealed according to the invention by the folded-around second carrier film 15 in each case. The fourth side edge 5.4 is sealed according to the invention by a folded-around first carrier film 14.

In aging tests, such composite panes 100 present a significantly reduced brightening in the edge region of the functional element 5, since diffusion of the plasticizer out of the intermediate layers 3a, 3b into the functional element 5 and a resulting degradation of the functional element 5 is avoided.

In an advantageous development of the functional element 5 according to the invention, an adhesive means, for example, an acrylate-based adhesive, that fixedly glues the carrier films 14, 15 to one another, is arranged between the touching sections of the second carrier film 15 and the edge region 14.1 of the first carrier film 14. The adhesive connection prevents slippage of the carrier films 14, 15 during assembly. At the same time, inclusions of air bubbles and resultant visual distractions or impairments are avoided since the folded-around section of the second carrier film 15 rests fixedly on the first carrier film 14.

Of course, the composite pane according to the invention is not limited to the exemplary embodiment presented here. Further exemplary embodiments not presented here include, for example, windshields or roof panels of vehicles and the use of electrically controllable functional elements 5 as sun visors.

FIGS. 3A, 3B, 3C, and 3D depict exemplary embodiments of a functional element 5 according to the invention during production.

FIG. 4 depicts an exemplary embodiment of the production method according to the invention with reference to a flowchart with the steps S1 through S4.

Initially, in a first step S1, a stack sequence formed of a first carrier film 14, a first surface electrode 12, an active layer 11, a second surface electrode 13, and a second carrier film 15 is provided. Such stack sequences are, for example, commercially available by the meter as multilayer film material. Then, the product is customized and trimmed to the dimensions of the later use, for example, by laser cutting.

FIG. 3A depicts an enlarged representation of the side edge 5.1 of such a stack sequence in the first step S1. The various elements of the stack sequence, i.e., the first carrier film 14, the first surface electrode 12, the active layer 11, the second surface electrode 13, and the second carrier film 15 have the same dimensions and are stacked congruently atop one another.

In a second step S2, for example, the first carrier film 14 is cut back at at least one side edge and preferably at all side edges of the stack sequence by a region of width u, by means of which an overhanging region 15.1 of the second carrier film 15 is formed. The result is accordingly shown in FIG. 3B for the side edge 5.1. The cut back is done, for example, by mechanical cutting with a blade along a parallel line at a distance u from the side edge of the first carrier film 14.

In a third step S3, the active layer 11 and the second surface electrode 13 are removed in the overhanging region 15.1. The active layer 11 can, for example, be removed by wiping with a cloth and a solvent such as water or ethanol. The result is accordingly shown in FIG. 3C. The surface electrode 13 can, for example, be removed by laser ablation.

In a third step S4, the second carrier film 15 is folded around the cut-back side edge 5.1 of the first carrier film 14 and arranged on the outward surface of the first carrier film 14 in the edge region 14.1. The result is accordingly shown in FIG. 3D.

The second carrier film 15 can, optionally, be bonded over its entire surface to the first carrier film 14, for example, by gluing. The folded-around carrier film 14 should advantageously contain no adhesive in an edge region, for example, at least in a width w=4 mm, since, otherwise, undesirable edge brightening can occur.

Independently of this, by lamination of the functional element 5 according to the invention in a composite pane 100 and by the internal pressure in the finished laminated composite pane 100, the second carrier film 15 and the first carrier film 14 are firmly pressed against each other in the edge region 14.1 and fixed, resulting in a hermetic seal.

LIST OF REFERENCE CHARACTERS:

1 outer pane
2 inner pane
3a first intermediate layer
3b second intermediate layer
5 functional element having electrically controllable optical properties
5.1,5.2,5.3,5.4 side edge of the functional element 5
11 active layer of the functional element 5
12 first surface electrode of the functional element 5
13 second surface electrode of the functional element 5
14 first carrier film
14.1 edge region of the first carrier film
15 second carrier film
15.1 overhanging region of the second carrier film
20.1 exit surface
100 composite pane
D upper edge of the windshield, roof edge
M lower edge of the windshield, engine edge
u overhang, width of the overhanging region 15.1
w width of the edge region 14.1
X-X' section line
Z enlarged region

The invention claimed is:

1. A functional element having electrically controllable optical properties, comprising:
a stack sequence consisting of, successively along a thickness of the stack sequence, a first carrier film, a first surface electrode, with the first surface electrode being arranged on an inward surface of the first carrier film and bonded directly thereto, an active layer, a second surface electrode, and a second carrier film, with the second surface electrode being arranged between the active layer and the second carrier film and on an inward surface of the second carrier film and bonded directly thereto, the active layer being between the first and second surface electrodes and in direct contact with the first and second surface electrodes, wherein the second carrier film consists of a single film made with a same material composition, wherein
the second carrier film is folded around the first carrier film at least at one side edge and seals an exit surface of the active layer at the side edge,
at least one section of an overhanging region of the second carrier film is materially bonded to an edge region of the first carrier film, by permanently pressing the at least one section and the edge region together, by fusing the at least one section to the edge region, and/or by gluing the at least one section to the edge region, and
the second carrier film is implemented such that the second carrier film prevents diffusion of plasticizers through the carrier film.

2. The functional element according to claim 1, wherein the overhanging region of the second carrier film has a width u of at least 4 mm.

3. The functional element according to claim 1, wherein the active layer contains or is made of liquid crystals.

4. A composite pane having a functional element having electrically controllable optical properties, comprising:
- a stack sequence formed of an outer pane, a first intermediate layer, a second intermediate layer, and an inner pane, wherein the intermediate layers contain at least one thermoplastic polymer film with at least one plasticizer, and
- a functional element having electrically controllable optical properties according to claim 1 is arranged between the first intermediate layer and the second intermediate layer at least in sections.

5. The composite pane according to claim 4, wherein the intermediate layer contains at least 3 wt.-% of a plasticizer and the plasticizer contains or is made of aliphatic diesters of tri-or tetraethylene glycol.

6. The composite pane according to claim 4, wherein the intermediate layer contains at least 60 wt.-% polyvinyl butyral (PVB).

7. The composite pane according to claim 4, wherein the second carrier film is implemented such that the second carrier film prevents diffusion of plasticizers through the second carrier film.

8. The composite pane according to claim 4, wherein the second carrier film is low in plasticizer or is free of plasticizer.

9. The composite pane according to claim 4, wherein the functional element is circumferentially surrounded by a third intermediate layer.

10. A method for producing a functional element according to claim 1 having electrically controllable optical properties, comprising:
a) providing a stack sequence formed of a first carrier film, a first surface electrode, an active layer, a second surface electrode, and a second carrier film,
b) cutting back the first carrier film at at least one side edge by a region of the width u, by which means an overhanging region of the second carrier film is formed, and
c) folding the overhanging region of the second carrier film around the cut-back side edge of the first carrier film.

11. The method according to claim 10, wherein, between steps b) and c), the second surface electrode is removed in the overhanging region by mechanical, chemical, and/or physical removal.

12. A method comprising utilizing a composite pane according to claim 4 as a windshield or roof panel of a vehicle and the electrically controllable functional element as a sun visor.

13. A method comprising utilizing a composite pane having an electrically controllable functional element according to claim 1 as interior glazing or exterior glazing in a vehicle or a building and the electrically controllable functional element as a sunscreen or as a privacy screen.

14. The functional element according to claim 2, wherein the width u is from 4 mm to 50 mm.

15. The functional element according to claim 3, wherein the active layer is made of polymer dispersed liquid crystals (PDLC).

16. The composite pane according to claim 5, wherein the intermediate layer contains at least 30 wt.-% of a plasticizer.

17. The composite pane according to claim 5, wherein the plasticizer is made of triethylene glycol bis(2-ethylhexanoate).

18. The composite pane according to claim 6, wherein the intermediate layer contains at least 90 wt.-% polyvinyl butyral (PVB).

19. The composite pane according to claim 8, wherein the second carrier film contains or is made of polyethylene terephthalate (PET) or polyvinyl fluoride (PVF).

20. The method according to claim 11, wherein, between steps b) and c), the second surface electrode is removed in the overhanging region by laser ablation.

* * * * *